(12) United States Patent
Fukinuki et al.

(10) Patent No.: US 10,744,632 B2
(45) Date of Patent: Aug. 18, 2020

(54) POWER TOOL

(71) Applicant: Nanjing Chervon Industry Co., Ltd., Nanjing (CN)

(72) Inventors: Masatoshi Fukinuki, Nanjing (CN); Yasheng Chen, Nanjing (CN); Wei Lu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 147 days.

(21) Appl. No.: 16/144,283

(22) Filed: Sep. 27, 2018

(65) Prior Publication Data

US 2019/0160645 A1 May 30, 2019

(30) Foreign Application Priority Data

Nov. 29, 2017 (CN) .......................... 2017 1 1224435
Nov. 29, 2017 (CN) .......................... 2017 1 1224500

(51) Int. Cl.
*B25F 5/00* (2006.01)
*B23B 45/00* (2006.01)
*B25B 23/14* (2006.01)
*B25B 21/00* (2006.01)

(52) U.S. Cl.
CPC ............ *B25F 5/001* (2013.01); *B23B 45/008* (2013.01); *B25B 21/00* (2013.01); *B25B 23/141* (2013.01); *B25D 2250/201* (2013.01)

(58) Field of Classification Search
CPC ....... B25F 5/001; B23B 45/008; B25B 21/00; B25B 23/141

USPC ..................................... 173/18, 48, 170, 171
See application file for complete search history.

(56) References Cited

U.S. PATENT DOCUMENTS

| 4,493,223 | A | * | 1/1985 | Kishi | .................... B23B 45/008 173/217 |
| 6,796,921 | B1 | | 9/2004 | Buck et al. | |
| 7,896,097 | B2 | * | 3/2011 | Teng | ....................... B25B 21/02 173/178 |
| 2001/0052419 | A1 | * | 12/2001 | Quirijnen | ................ B25F 5/001 173/217 |

(Continued)

FOREIGN PATENT DOCUMENTS

| DE | 102009060929 A1 | 6/2011 |
| EP | 2551063 A1 | 1/2013 |
| EP | 2724824 A1 | 4/2014 |

*Primary Examiner* — Nathaniel C Chukwurah
(74) *Attorney, Agent, or Firm* — Greenberg Traurig, LLP

(57) ABSTRACT

A power tool, including an output member, a motor, a housing, a transmission device, and a shifting device. The shifting device includes a first shifting element, a second shifting element, an operation member, and a connecting member. The first shifting element is capable of switching between a first position and a second position, and the second shifting element is capable of switching between a third position and a fourth position. When sliding relative to the housing, the operation member drives the first shifting element to switch between the first position and the second position, and a position of the second shifting element remains unchanged. When the operation member rotates relative to the housing, the connecting member drives the second shifting element to switch between the third position and the fourth position, and a position of the first shifting element remains unchanged.

20 Claims, 21 Drawing Sheets

(56) References Cited

U.S. PATENT DOCUMENTS

| | | | |
|---|---|---|---|
| 2004/0198547 A1* | 10/2004 | Eisenhardt | B23B 45/008 |
| | | | 475/299 |
| 2005/0199404 A1* | 9/2005 | Furuta | B25B 21/00 |
| | | | 173/48 |
| 2007/0201748 A1* | 8/2007 | Bixler | B25F 5/001 |
| | | | 382/225 |
| 2009/0098971 A1* | 4/2009 | Ho | B23B 45/008 |
| | | | 475/153 |
| 2013/0206435 A1* | 8/2013 | Papp | B25B 21/00 |
| | | | 173/20 |

* cited by examiner

POWER TOOL

RELATED APPLICATION INFORMATION

This application claims the benefit under 35 U.S.C. § 119(a) of Chinese Patent Application No. CN 201711224500.3, filed on Nov. 29, 2017, and Chinese Patent Application No. CN 201711224535.4, filed on Nov. 29, 2017, both of which are incorporated by reference in their entirety herein.

TECHNICAL FIELD

The following generally relates to a power tool, and specifically, to a shifting device of a power tool.

RELATED ART

Existing power tools such as electric drills and screwdrivers generally include gearboxes for deceleration. The gearbox generally has a plurality of different reduction ratios. Therefore, to enable the power tool to have different output rotation speeds, the power tool further includes a shifting device used by the gearbox to switch between different reduction ratios. However, existing shifting devices have a relatively complex structure.

SUMMARY

In one aspect of the disclosure, a power tool includes an output member, a motor, a housing, a transmission device, and a shifting device. The output member is configured to transmit power. The motor is configured to drive the output member. The housing is configured to accommodate the motor. The transmission device is configured to transmit power between the motor and the output member, and the transmission device has at least four transmission states in which the output member is capable of outputting different power. The shifting device is configured to drive the transmission device to switch between the different transmission states, and the shifting device includes a first shifting element, a second shifting element, an operation member, and a connecting member. The first shifting element is capable of switching between at least a first position and a second position in which the transmission device is in different transmission states, and the second shifting element is capable of switching between at least a third position and a fourth position in which the transmission device is in different transmission states. The operation member is operated by a user. The operation member can slide relative to the housing in a first straight line and rotate relative to the housing about a central axis. The connecting member connects the operation member to the second shifting element. When sliding relative to the housing, the operation member drives the first shifting element to switch between the first position and the second position, and in this case, a position of the second shifting element remains unchanged. When the operation member rotates relative to the housing, the connecting member drives the second shifting element to switch between the third position and the fourth position, and in this case, a position of the first shifting element remains unchanged.

Further, the power tool may include a limiting device configured to limit rotation of the operation member when the operation member slides relative to the housing and limit sliding of the operation member when the operation member rotates relative to the housing.

Further, the first shifting element may be capable of rotating to the first position and the second position by using a first axis as an axis, and the second shifting element may be capable of rotating to the third position and the fourth position by using a second axis as an axis.

Further, the first axis of rotation of the first shifting element may be parallel to or overlap the second axis of rotation of the second shifting element.

Further, the operation member may include a first driving portion and a second driving portion. The first driving portion is connected to the first shifting element to drive the first shifting element to switch between the first position and the second position when the operation member slides and allow the position of the first shifting element to remain unchanged when the operation member rotates. The second driving portion is connected to the connecting member to drive the connecting member to rotate when the operation member rotates and allow a position of the connecting member to remain unchanged when the operation member slides.

Further, the first straight line in which the operation member slides may be parallel to the central axis of rotation of the operation member. The first driving portion may be an arc-shaped groove extending in a circumferential direction around the central axis, and the first shifting element includes a first driven portion at least partially extending into the arc-shaped groove.

Further, the second driving portion may be a bump extending in a direction parallel to the first straight line, and the connecting member is formed with a recess into which the bump can be embedded. The second driving portion may also be a recess extending in the direction of the first straight line and the connecting member is formed with a bump that can be embedded into the recess.

Further, the connecting member may be formed with a third driving portion, configured to drive the position of the second shifting element to change when the connecting member rotates.

Further, the third driving portion may include an inclined surface extending along a plane obliquely intersecting with the central axis, and the second shifting element may include a second driven portion in contact with the inclined surface.

Further, the power tool may include a chuck configured to connect to a drill. The chuck is connected to the output member.

In another aspect of the disclosure, an power tool includes an output shaft configured to output power, a motor including or connected to a drive shaft, a housing configured to accommodate the motor, a transmission device configured to transmit power between the output shaft and the drive shaft and having at least two different transmission states in which the output shaft outputs power at different rotation speed, and a shifting device configured to drive the transmission device to switch between the different transmission states. The transmission device includes a first movable member disposed around a central axis, and a device housing formed with an accommodation cavity used for accommodating the first movable member. The first movable member and the device housing constitute a slidable connection in a direction parallel to the central axis. The shifting device includes a first shifting element capable of sliding relative to the device housing and driving the first movable member to slide when moving relative to the device housing and an operation member operated by a user and capable of moving relative to the housing. The operation member is further formed with or connected to a first driving structure, including a first driving inclined surface in contact with the first shifting element, for driving the first shifting element to move when the operation member moves relative to the housing.

Further, the operation member and the housing may constitute a rotatable connection using the central axis as an axis, and a plane in which the first driving inclined surface lies obliquely intersects with the central axis.

Further, the first shifting element and the device housing may constitute a rotatable connection using a first axis as an axis, and a plane in which the first driving inclined surface lies obliquely intersects with the first axis.

Further, the operation member and the housing may constitute a rotatable connection using the central axis as an axis, and the first axis of rotation of the first shifting element relative to the device housing is perpendicular to the central axis.

Further, the transmission device may be formed with a first arc-shaped hole extending in a circumferential direction around the first axis, and the first shifting element may run through the first arc-shaped hole.

Further, the first shifting element may include a first shifting portion connected to the first movable member; a first rotation shaft portion being a rotation axis point of the rotatable connection constituted by the first shifting element and the device housing, and a first driven portion configured to come into contact with the first driving structure to be driven by the first driving structure. The first shifting portion and the first driven portion may be respectively disposed on two sides of the first rotation shaft portion.

Further, the shifting device may include a first biasing element for generating a biasing force causing the first shifting element and the first driving structure to remain in contact with each other.

Further, the first driving structure may include a first vertical surface connected to the first driving inclined surface and the first vertical surface obliquely intersects with the first driving inclined surface.

Further, the transmission device may include a second movable member disposed around the central axis. The second movable member and the device housing constitute a slidable connection in a direction parallel to the central axis. The shifting device includes a second shifting element, for constituting a movable connection with the device housing and driving the second movable member to slide when moving relative to the device housing. The operation member is further formed with or connected to a second driving structure, including a second driving inclined surface in contact with the second shifting element and driving the second shifting element to move when the operation member moves relative to the housing.

Further, the power tool may include a chuck configured to connect to a drill. The chuck is connected to the output shaft.

In view of the foregoing, it will be appreciated that the shifting device has a simple structure that allows a user to perform a shifting operation easily.

DETAILED DESCRIPTION

Figure 1:
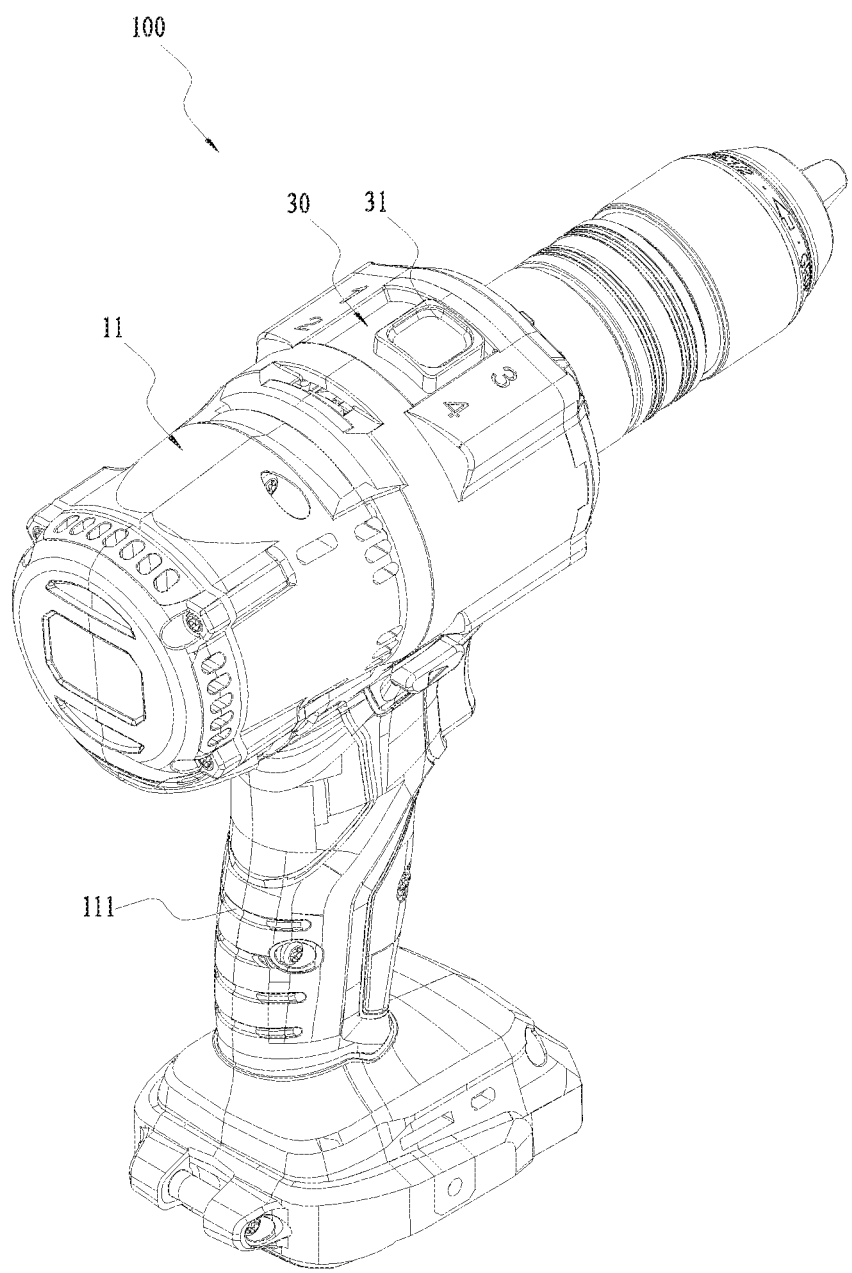
FIG. 1 is a three-dimensional view of an example power tool according to the description that follows.
Figure 2:
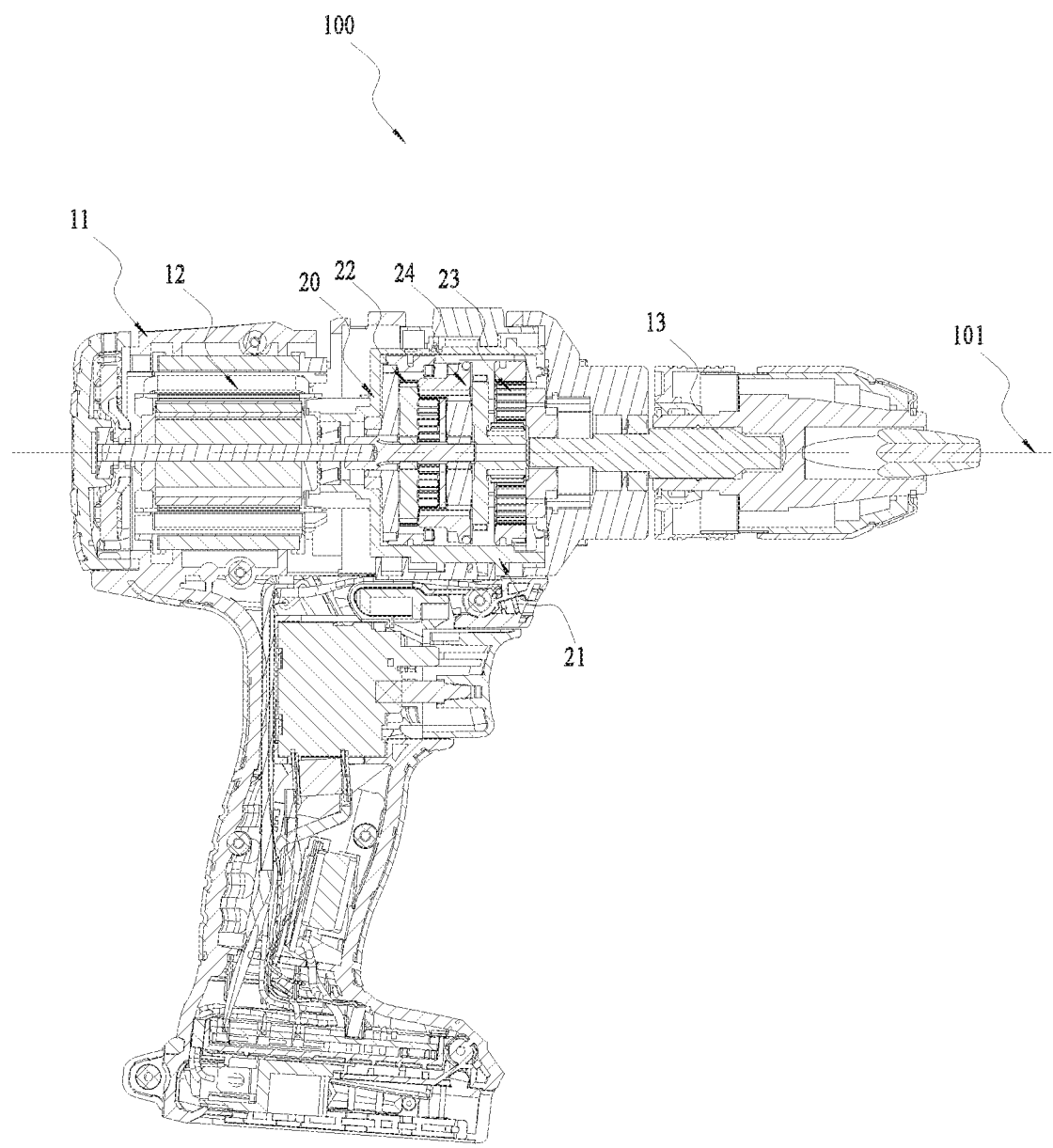
FIG. 2 is a cross-sectional view of the power tool in FIG. 1.

An example power tool 100, shown in FIG. 1 and FIG. 2, includes a housing 11, a motor 12, an output member 13, a transmission device 20, and a shifting device 30. The housing 11 is configured to accommodate the motor 12, the output member 13, and the transmission device 20. The housing 11 may further form a handle 111 held by a user. The motor 12 is configured to drive the output member 13. The output member 13 is configured to output power, and may specifically be an output shaft. The transmission device 20 is disposed between the motor 12 and the output member 13, and is configured to transmit power between the motor 12 and the output member 13. The transmission device 20 has a plurality of transmission states in which the output member 13 can output different power. The shifting device 30 is configured to drive the transmission device 20 to switch between the different transmission states, and the shifting device 30 includes an operation member 31 that is operated by the user to be at different gears.

In this example the power tool 100 is specifically illustrated and described as being an electric drill. Actually, any tool that includes the transmission device 20 capable of switching between different transmission states and the shifting device 30 is intended to fall within the protective scope of the appended claims.

As shown in FIG. 1 to FIG. 11, the motor 12 includes or is fixedly connected to a drive shaft 121 configured to output power. The drive shaft 121 can rotate relative to the housing 11 by using a central axis 101 as an axis, and the drive shaft 121 is further formed with drive teeth 121a extending in a direction of the central axis 101.

The transmission device 20 includes a device housing 21, a first planetary gear system 22, a second planetary gear system 23, and a third planetary gear system 24. The transmission device 20 can have four different transmission states by using the three planetary gear systems, so that the output member 13 outputs power at different rotation speeds.

The device housing 21 forms an accommodation cavity 211 around the central axis 101, and the first planetary gear system 22, the second planetary gear system 23, and the third planetary gear system 24 are disposed in the accommodation cavity 211. The first planetary gear system 22 is configured to introduce, into the transmission device 20, power output by the drive shaft 121. The second planetary gear system 23 is configured to output power of the transmission device 20 to the output member 13. The third planetary gear system 24 is disposed between the first planetary gear system 22 and the second planetary gear system 23.

The first planetary gear system 22 includes a first movable member 221, a first planet carrier 222, and a first planet gear 223. The first movable member 221 is disposed around the central axis 101, and is fixed relative to the device housing 21 in a circumferential direction around the central axis 101. The first movable member 221 further constitutes a slidable connection with the device housing 21 in a direction parallel to the central axis 101. The first planet carrier 222 is disposed in the device housing 21, and can rotate about the central axis 101, that is, the first planet carrier 222 is rotatably disposed in the accommodation cavity 211 formed by the device housing 21. There is a plurality of first planet gears 223, and specifically, there may be three first planet gears 223. The three first planet gears 223 are disposed around the drive shaft 121. The three first planet gears 223 are rotatably mounted to the first planet carrier 222 by using a pin. First engaged teeth 222a are formed on the periphery of the first planet carrier 222. The first movable member 221 is formed with first locking teeth 221a capable of cooperating with the first engaged teeth 222a to lock rotation of the first planet carrier 222. The first planet gear 223 specifically includes a large planet gear portion 223a and a small planet gear portion 223b that are fixedly connected. The large planet gear portion 223a is engaged with the drive teeth 121a on the drive shaft 121, and there is a gap between the small planet gear portion 223b and the drive shaft 121, so that the small planet gear portion 223b and the drive shaft 121 cannot be engaged with each other.

The third planetary gear system 24 includes a third movable member 241, a third planet gear 242, and a third planet carrier 243. The third movable member 241 is specifically a third inner ring gear on an inner periphery of which third inner teeth 241a are formed. The third movable member 241 is disposed around the central axis 101 and is centered about the central axis 101. The third movable member 241 can further rotate relative to the device housing 21 by using the central axis 101 as an axis. Third outer teeth 241b are further formed on an outer periphery of the third movable member 241. Second locking teeth 221b capable of cooperating with the third outer teeth 241b to lock rotation of the third movable member 241 relative to the device housing 21 are further formed on a part of the first movable member 221 that faces the third movable member 241. The small planet gear portion 223b of the first planet gear 223 is further engaged with the third inner teeth 241a of the third movable member 241. The third planet gear 242 is engaged with the drive teeth 121a on the drive shaft 121. There is a plurality of third planet gears 242. Specifically, there may be three third planet gears 242. The three third planet gears 242 are rotatably mounted to the third planet carrier 243 by using a pin, and third engaged teeth 243a are further formed on an outer periphery of the third planet carrier 243.

The second planetary gear system 23 includes a second sun gear 231, a second planet gear 232, a second movable member 233, and a second planet carrier 234. The second sun gear 231 is fixedly connected to the third planet carrier 243. There is a plurality of second planet gears 232. Specifically, there may be four second planet gears 232. The four second planet gears 232 are rotatably mounted to the second planet carrier 234 by using a pin, and the second planet gears 232 are further separately engaged with the second sun gear 231. The second movable member 233 is specifically a second inner ring gear on an inner periphery of which second inner teeth 233a are formed, and the second movable member 233 is rotatably disposed around the central axis 101 in the accommodation cavity 211 formed by the device housing 21. Second outer teeth 233b are further formed on an outer periphery of the second movable member 233. The second planet carrier 234 is configured to mount the second planet gear 232, and the second planet carrier 234 further synchronously rotate with the output member 13 to output power to the output member 13. The second movable member 233 may be rotatably disposed in the device housing 21 by using the central axis 101 as an axis. The second movable member 233 and the device housing 21 further constitute a slidable connection in the direction parallel to the central axis 101. The transmission device 20 further includes a locking member 25. The locking member 25 is formed with locking teeth 251 for locking rotation of the second movable member 233 when the locking member 25 is engaged with the second outer teeth 233b. The third planet carrier 243 and the locking member 25 are disposed in different axial positions. When moving to the second inner teeth 233a in the direction parallel to the central axis 101 to be engaged with the third engaged teeth 243a, the second movable member 233 synchronously rotates with the third planet carrier 243. When the second movable member 233 moves to the second outer teeth 233b in the direction parallel to the central axis 101 to be engaged with the locking teeth 251, the locking member 25 locks rotation of the second movable member 233.

Figure 3:
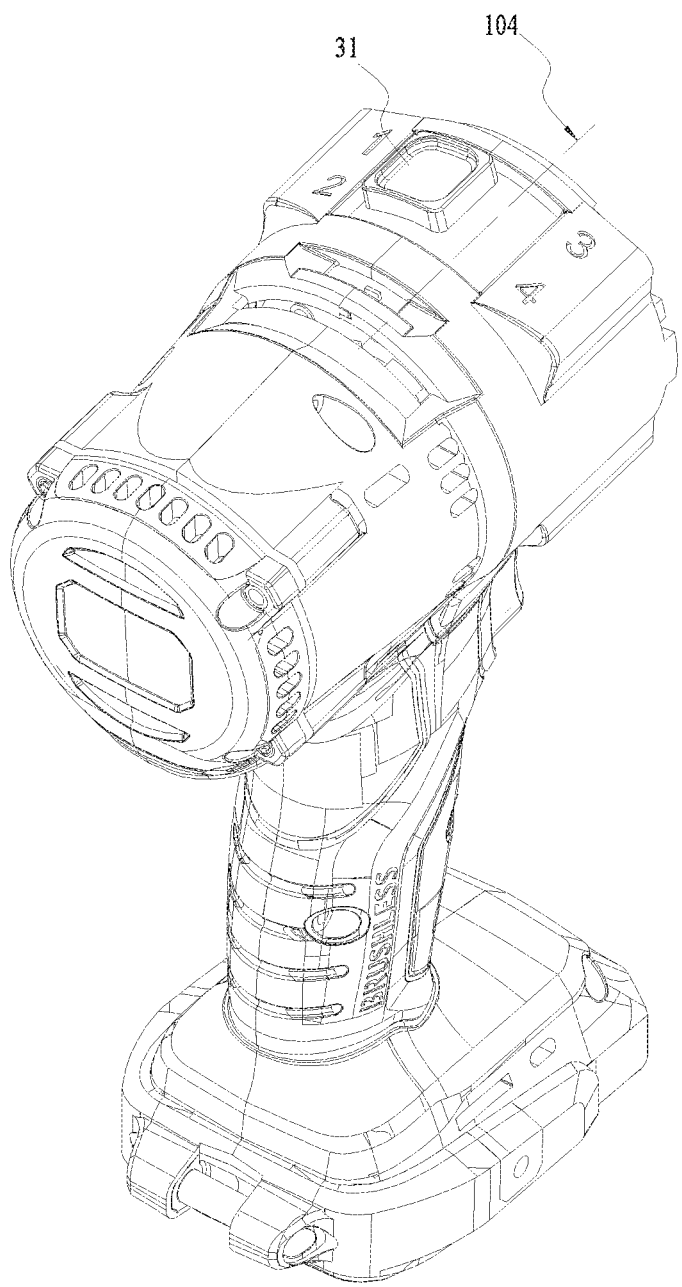
FIG. 3 is a three-dimensional view of a part of a housing, a transmission device, and a shifting device in FIG. 1 when an operation member is in a first-gear position.
Figure 4:
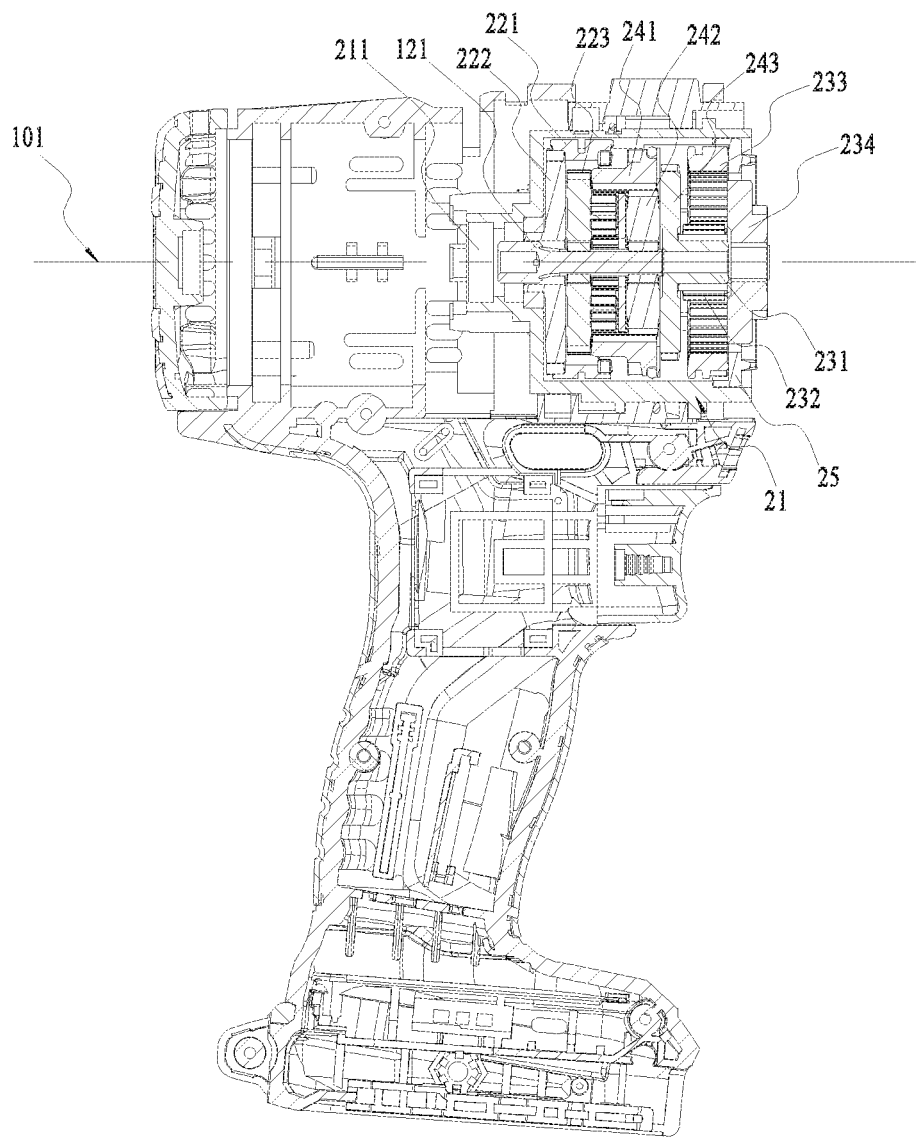
FIG. 4 is a cross-sectional view of a structure shown in FIG. 3.
Figure 11:
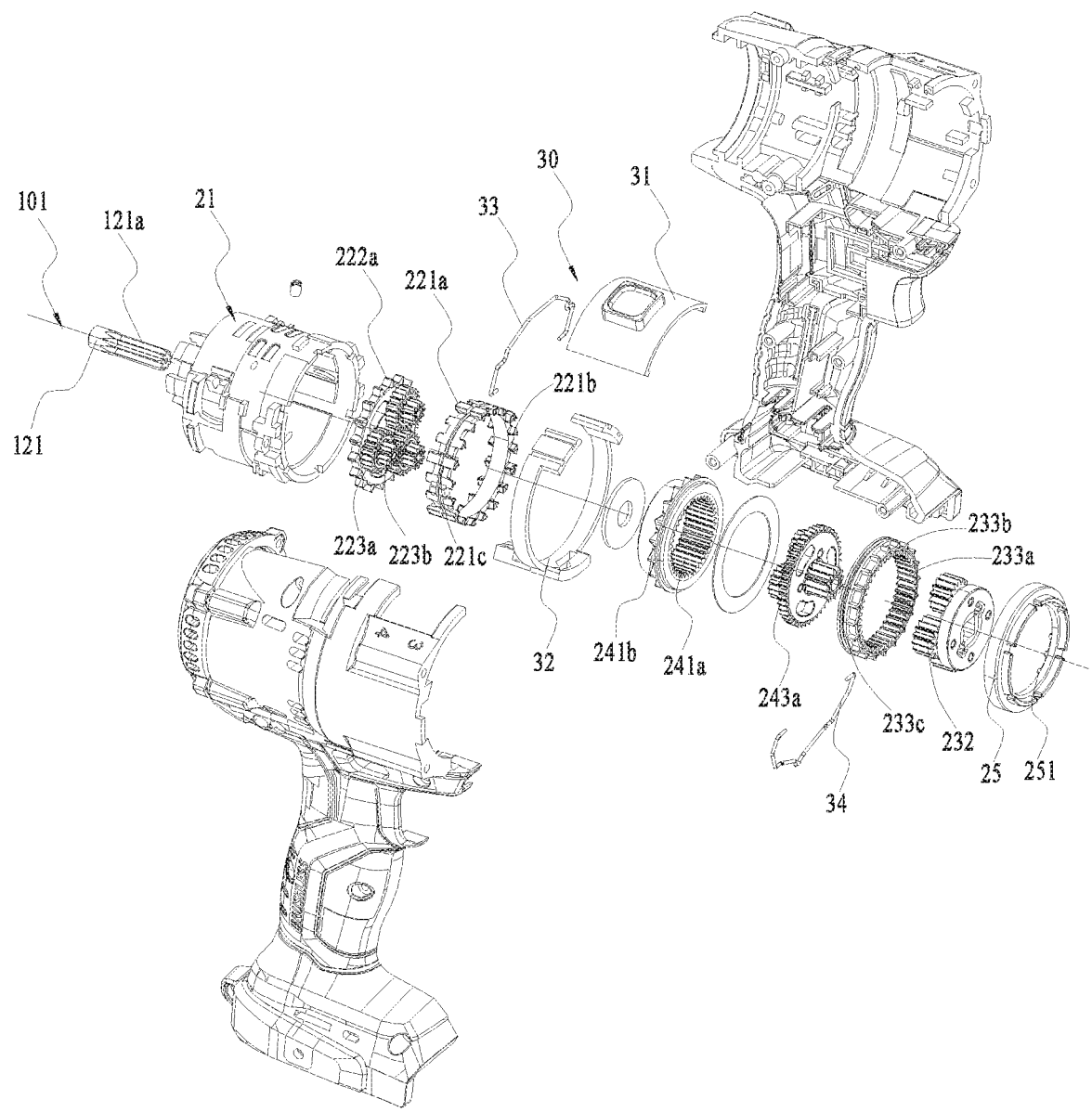
FIG. 11 is an exploded view of a structure shown in FIG. 3.

As shown in FIG. 3, FIG. 4, and FIG. 11, when the operation member 31 is operated by the user to be located in a first-gear position, and the first movable member 221 slides to a first axial position in the direction parallel to the central axis 101, the first locking teeth 221a are engaged with the first engaged teeth 222a to lock rotation of the first planet carrier 222, and the second movable member 233 slides to a third axial position. In this way, the locking teeth 251 of the locking member 25 are engaged with the second outer teeth 233b to lock rotation of the second movable member 233. In this case, the transmission device 20 has a relatively large first transmission ratio, and the output member 13 rotates at a relatively low first speed. That is, the transmission device 20 in this case is in a first transmission state, and the power tool 100 can output a relatively large torsion force.

Figure 5:
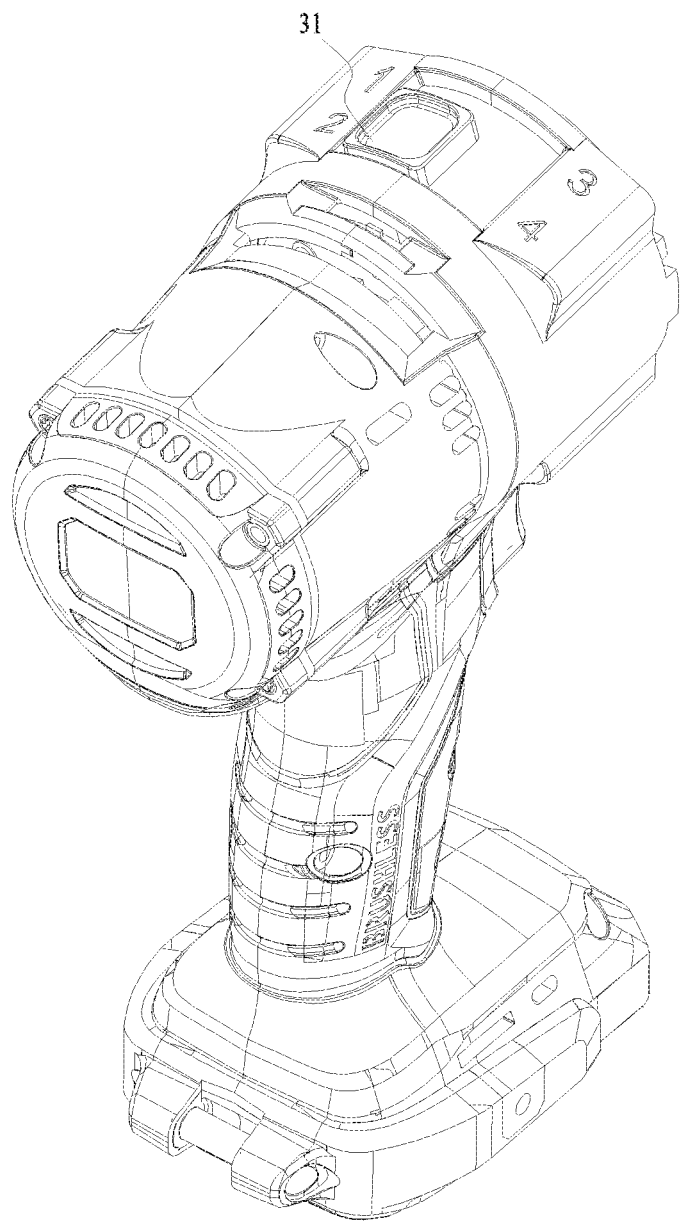
FIG. 5 is a three-dimensional view of a part of a housing, a transmission device, and a shifting device in FIG. 1 when an operation member is in a second-gear position.
Figure 6:
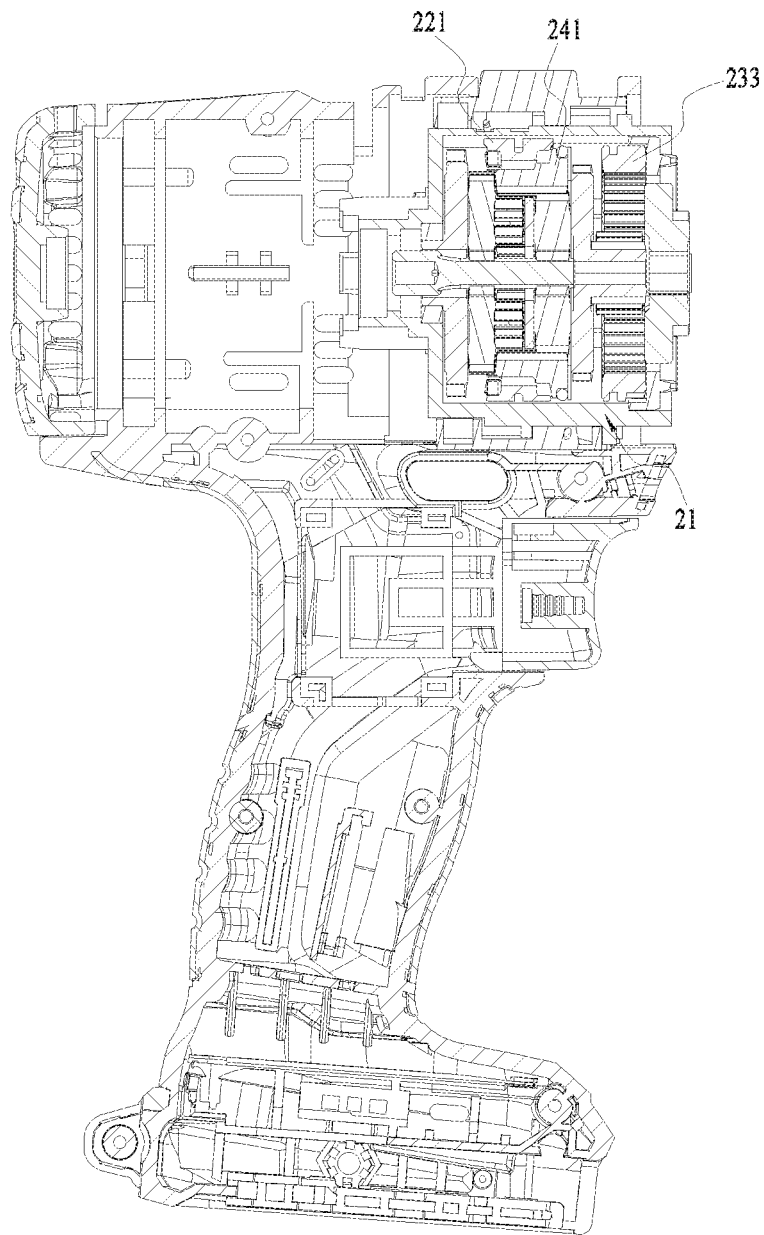
FIG. 6 is a cross-sectional view of a structure shown in FIG. 5.

As shown in FIG. 5, FIG. 6, and FIG. 11, when the operation member 31 is operated by the user to be located in a second-gear position, and the first movable member 221 slides to a second axial position in the direction parallel to the central axis 101, the second locking teeth 221b are engaged with the third outer teeth 241b to lock rotation of the third movable member 241, and the second movable member 233 remains in the third axial position. In this case, the transmission device 20 has a second transmission ratio, and the output member 13 rotates at a second speed. That is, the transmission device 20 in this case is in a second transmission state, and the second transmission ratio of the transmission device 20 is approximately half the first transmission ratio.

Figure 7:
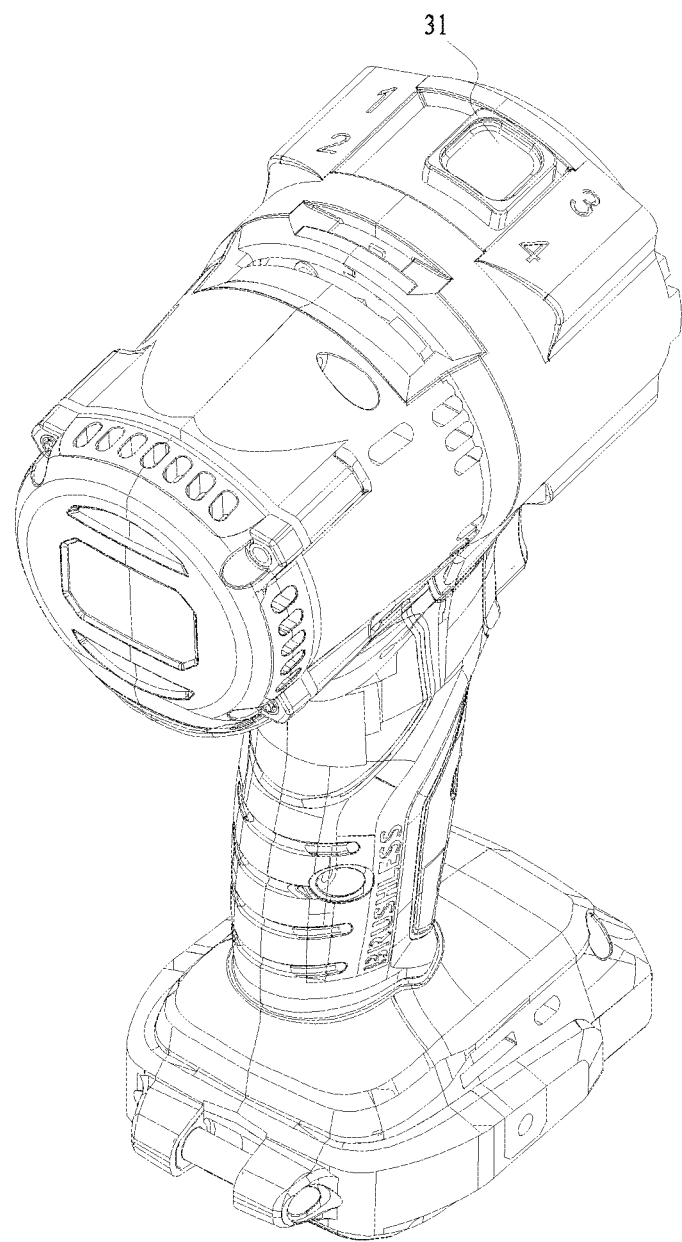
FIG. 7 is a three-dimensional view of a part of a housing, a transmission device, and a shifting device in FIG. 1 when an operation member is in a third-gear position.
Figure 8:
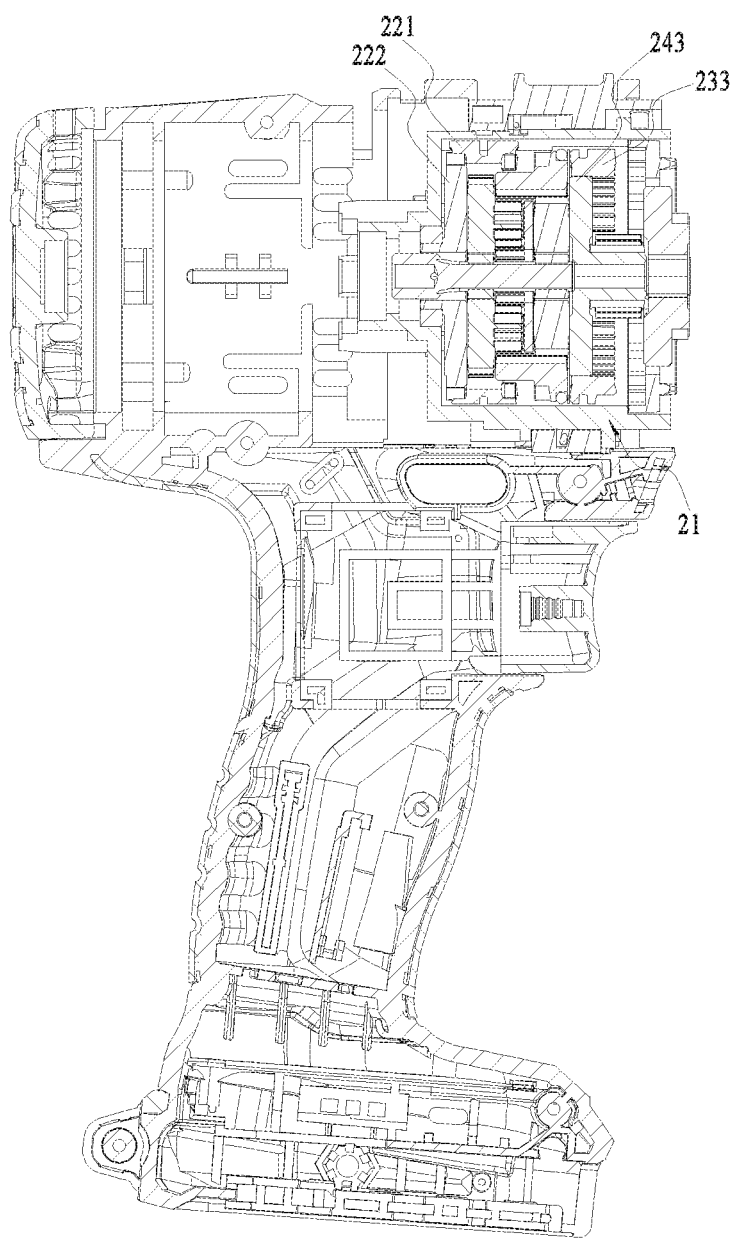
FIG. 8 is a cross-sectional view of a structure shown in FIG. 7.

As shown in FIG. 7, FIG. 8, and FIG. 11, when the operation member 31 is operated by the user to be located in a third-gear position, and the first movable member 221 returns back to the first axial position, rotation of the first planet carrier 222 is locked again, and the second movable member 233 moves to a fourth axial position in the direction parallel to the central axis 101. The second inner teeth 233a of the second movable member 233 are engaged with the third engaged teeth 243a, so that the second movable member 233 synchronously rotates with the third planet carrier 243. In this case, the transmission device 20 has a third transmission ratio, and the output member 13 rotates at a third speed. That is, the transmission device 20 in this case is in a third transmission state, and the third transmission ratio of the transmission device 20 is less than the second transmission ratio.

Figure 9:
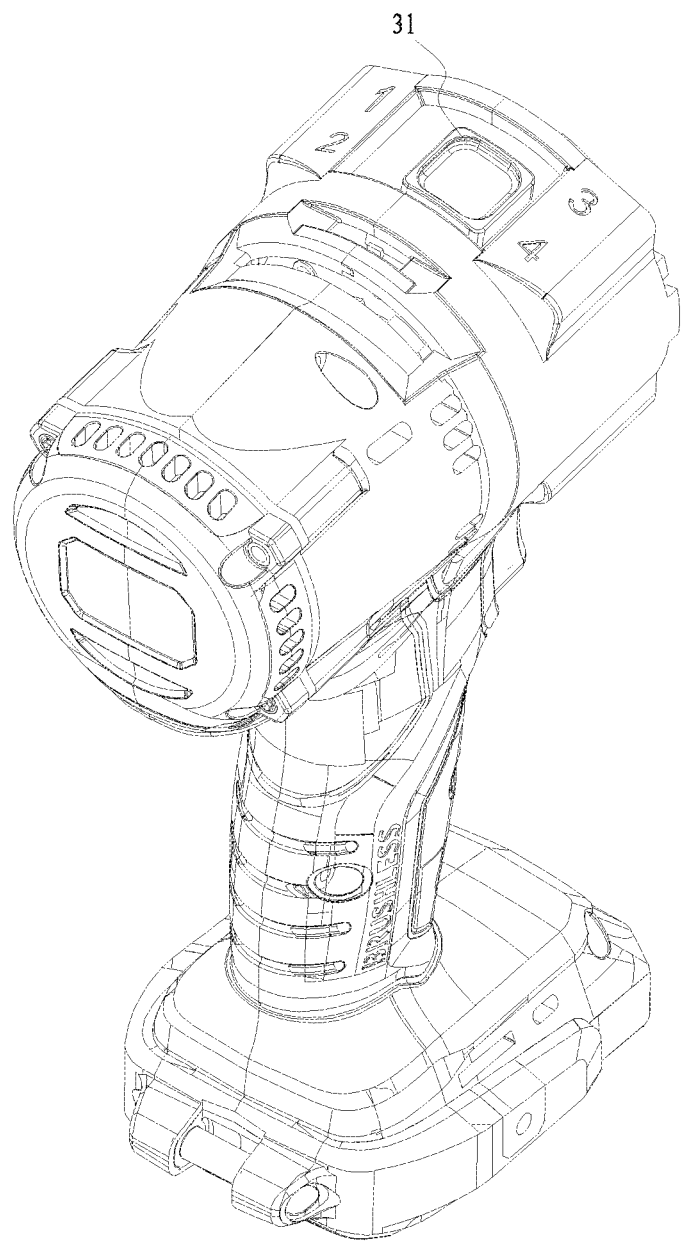
FIG. 9 is a three-dimensional view of a part of a housing, a transmission device, and a shifting device in FIG. 1 when an operation member is in a fourth-gear position.
Figure 10:
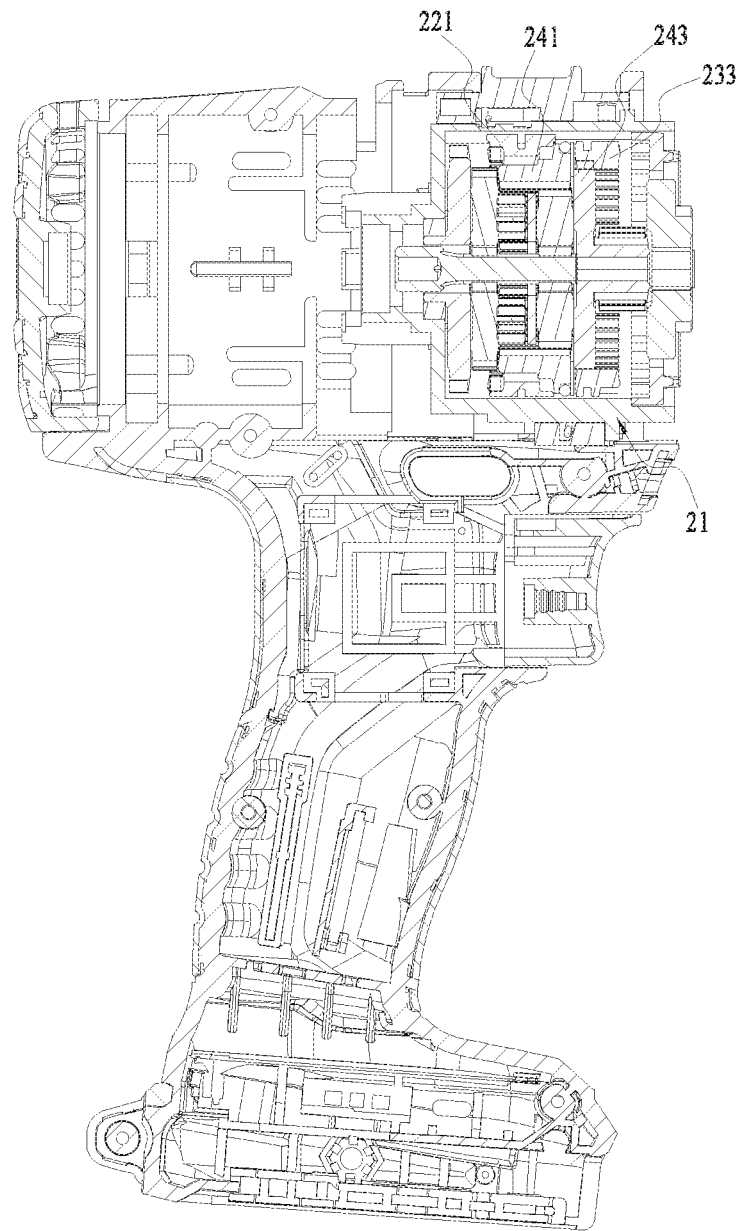
FIG. 10 is a cross-sectional view of a structure shown in FIG. 9.

As shown in FIG. 9, FIG. 10, and FIG. 11, when the operation member 31 is operated by the user to be located in a fourth-gear position, the first movable member 221 moves to the second axial position again and the second movable member 233 remains in the fourth axial position. Rotation of the third movable member 241 relative to the device housing 21 is locked again, and the second movable member 233 synchronously rotates with the third planet carrier 243. In this case, the transmission device 20 has a fourth transmission ratio, and the output member 13 rotates at a fourth speed. That is, the transmission device 20 in this case is in a fourth transmission state, and the fourth transmission ratio of the transmission device 20 is half the third transmission ratio. In this case, the power tool 100 can output at a relatively large rotation speed.

To enable the transmission device 20 to switch between different transmission states, the shifting device 30 needs to cause a change in positions of the first movable member 221 and the second movable member 233 in the direction parallel to the central axis 101. Specifically, the shifting device 30 can enable the first movable member 221 to switch between the first axial position and the second axial position and can further enable the second movable member 233 to switch between the third axial position and the fourth axial position.

As shown in FIG. 11 to FIG. 16, the shifting device 30 includes the foregoing operation member 31, and further includes a connecting member 32, a first shifting element 33, and a second shifting element 34. The operation member 31 is operated by the user to cause the transmission device 20 to be in different transmission states. The connecting member 32 connects the operation member 31 to the second shifting element 34, the first shifting element 33 is connected to the first movable member 221, and the second shifting element 34 is connected to the second movable member 233.

Specifically, the first shifting element 33 and the device housing 21 constitute a rotatable connection using a first axis 102 as an axis, and the first axis 102 is perpendicular to the central axis 101. The first shifting element 33 can rotate to a first position and a second position when rotating relative to the device housing 21 by using the first axis 102 as an axis. The first shifting element 33 specifically includes a first shifting portion 331, a first rotation shaft portion 332, and a first driven portion 333. The first shifting portion 331 is connected to the first movable member 221. When the first shifting element 33 rotates to the first position, the first shifting portion 331 can drive the first movable member 221 to move to the first axial position relative to the device housing 21 in the direction parallel to the central axis 101. When the first shifting element 33 rotates to the second position, the first shifting portion 331 can drive the first movable member 221 to move to the second axial position relative to the device housing 21 in the direction parallel to the central axis 101. Specifically, a first annular groove 221c is formed in the first movable member 221, and the first shifting portion 331 is inserted into the first annular groove 221c. The first rotation shaft portion 332 is used as a rotation axis point of rotation of the first shifting element 33 by using the first axis 102 as an axis. The first driven portion 333 is connected to the operation member 31 and is driven by the operation member 31. The first driven portion 333 and the first shifting portion 331 are disposed on two sides of the first rotation shaft portion 332, and are further disposed on two sides of the first axis 102. In this way, the first driven portion 333 can enable the first shifting element 33 to rotate when the first driven portion 333 is driven by the operation member 31, so that the first shifting portion 331 drives the first movable member 221 to switch between the first axial position and a the second axial position 103.

Similarly, the second shifting element 34 and the device housing 21 constitute a rotatable connection using a second axis 103 as an axis. The second axis 103 is perpendicular to the central axis 101, and the second axis 103 is parallel to the first axis 102. The second shifting element 34 can rotate to a third position and a fourth position when rotating relative to the device housing 21 by using the second axis 103 as an axis. The second shifting element 34 specifically includes a second shifting portion 341, a second rotation shaft portion 342, and a second driven portion 343. The second shifting portion 341 is connected to the second movable member 233. When the second shifting element 34 rotates to the third position, the second shifting portion 341 can drive the second movable member 233 to move to the third axial position relative to the device housing 21 in the direction parallel to the central axis 101. When the second shifting element 34 rotates to the fourth position, the second shifting portion 341 can drive the second movable member 233 to move to the fourth axial position relative to the device housing 21 in the direction parallel to the central axis 101. Specifically, a second annular groove 233c is formed in the second movable member 233, and the second shifting portion 341 is inserted into the second annular groove 233c. The second rotation shaft portion 342 is used as a rotation axis point of rotation of the second shifting element 34 by using the second axis 103 as an axis. The second driven portion 343 is connected to the connecting member 32 and is driven by the connecting member 32. The second driven portion 343 and the second shifting portion 341 are disposed on two sides of the second rotation shaft portion 342, and are further disposed on two sides of the second axis 103. In this way, the second driven portion 343 can enable the second shifting element 34 to rotate when the second driven portion 343 is driven by the connecting member 32, so that the second shifting portion 341 drives the second movable member 233 to switch between the third axial position and the fourth axial position.

A first arc-shaped hole 212 and a second arc-shaped hole 213 are further formed on the device housing 21. The first shifting element 33 runs through the first arc-shaped hole 212, the first arc-shaped hole 212 is used for guiding rotation of the first shifting element 33 by using the first axis 102 as an axis, and the first shifting portion 331 is located in the device housing 21. The second shifting element 34 runs through the second arc-shaped hole 213, the second arc-shaped hole 213 is used for guiding rotation of the second shifting element 34 by using the second axis 103 as an axis, and the second shifting portion 341 is located in the device housing 21.

At least a part of the operation member 31 is exposed out of the housing 11 to be operated by the user. The operation member 31 can slide relative to the housing 11 in a first straight line 104, and further constitute a rotatable connection using the central axis 101 as an axis.

The operation member 31 is formed with a first driving portion 311 connected to the first shifting element 33. When the operation member 31 slides relative to the housing 11 in the direction of the first straight line 104, the first driving portion 311 drives the first shifting element 33 to rotate to the first position or the second position by using the first axis 102 as an axis. In addition, when the operation member 31 rotates relative to the housing 11 by using the central axis 101 as an axis, the first driving portion 311 can further allow the position of the first shifting element 33 to remain unchanged. Specifically, the first driving portion 311 is an arc-shaped groove, and the arc-shaped groove extends in a circumferential direction around the central axis 101. The first driven portion 333 of the first shifting element 33 is embedded into the arc-shaped groove. In this way, when the operation member 31 slides, the arc-shaped groove comes into contact with the first driven portion 333 and drives the first driven portion 333 to change in position in the direction of the first straight line 104, thereby driving the first shifting element 33 to rotate by using the first axis 102 as an axis. When the operation member 31 rotates, the first driven portion 333 can rotate relative to the arc-shaped groove. That is, the first shifting element 33 can allow the arc-shaped groove to rotate relative to the first driven portion 333 when the position remains unchanged.

The operation member 31 is further formed with a second driving portion 312, and the second driving portion 312 is connected to the connecting member 32. When the operation member 31 rotates relative to the housing 11 by using the central axis 101 as an axis, the second driving portion 312 drives the connecting member 32 to synchronously rotate with the operation member 31. When the operation member 31 slides relative to the housing 11 in the direction of the first straight line 104, the second driving portion 312 can further allow a position of the connecting member 32 to remain unchanged. Specifically, the second driving portion 312 is a bump 312a extending in the direction parallel to the first straight line 104. A connecting member 32 is formed with a recess 321 into which the bump 312a can be embedded, and the recess 321 also extends in the direction parallel to the first straight line 104. In this way, when rotating, the operation member 31 can drive the connecting member 32 to synchronously rotate with the operation member 31. In addition, when sliding, the operation member 31 can rotate relative to the connecting member 32 in the direction of the first straight line 104. Certainly, it can be understood that in another examples, the second driving portion 312 may alternatively be a recess extending in the direction of the first straight line 104, and the connecting member 32 is formed with a bump embedded into the recess.

The connecting member 32 is further connected to the second shifting element 34. When synchronously rotating with the operation member 31, the connecting member 32 can drive the second shifting element 34 to switch between the third position and the fourth position, and the position of the first shifting element 33 in this case remains unchanged. The connecting member 32 is formed with a third driving portion 322. The third driving portion 322 is configured to drive the second shifting element 34 to rotate to the third position or the fourth position by using the second axis 103 as an axis when the connecting member 32 rotates. Specifically, the third driving portion 322 includes an inclined surface 322a. The inclined surface 322a extends along a plane obliquely intersecting with the central axis 101. A plane in which the inclined surface 322a lies further intersects with the second axis 103, and the second driven portion 343 of the second shifting element 34 comes into contact with the inclined surface 322a. In this way, when the connecting member 32 rotates, the inclined surface 322a can drive a position of the second driven portion 343 to change, thereby driving the second shifting element 34 to rotate by using the second axis 103 as an axis. The third driving portion 322 further includes a first vertical surface 322b and a second vertical surface 322c. Two ends of the inclined surface 322a are respectively connected to the first vertical surface 322b and the second vertical surface 322c. In this way, when the second driven portion 343 comes into contact with the first vertical surface 322b, the second shifting element 34 is in the third position. In this case, the user toggles the operation member 31, so that the connecting member 32 rotates together with the operation member 31 by using the central axis 101 as an axis. Then, the connecting member 32 rotates to a position in which the inclined surface 322a comes into contact with the second driven portion 343, and the connecting member 32 drives the second driven portion 343 to change in position in the direction parallel to the central axis 101, so that the second shifting element 34 rotates by using the second axis 103 as an axis. At last, the connecting member 32 rotates to a position in which the second vertical surface 322c comes into contact with the second driven portion 343. In this case, the second shifting element 34 also rotates to the fourth position.

Figure 12:
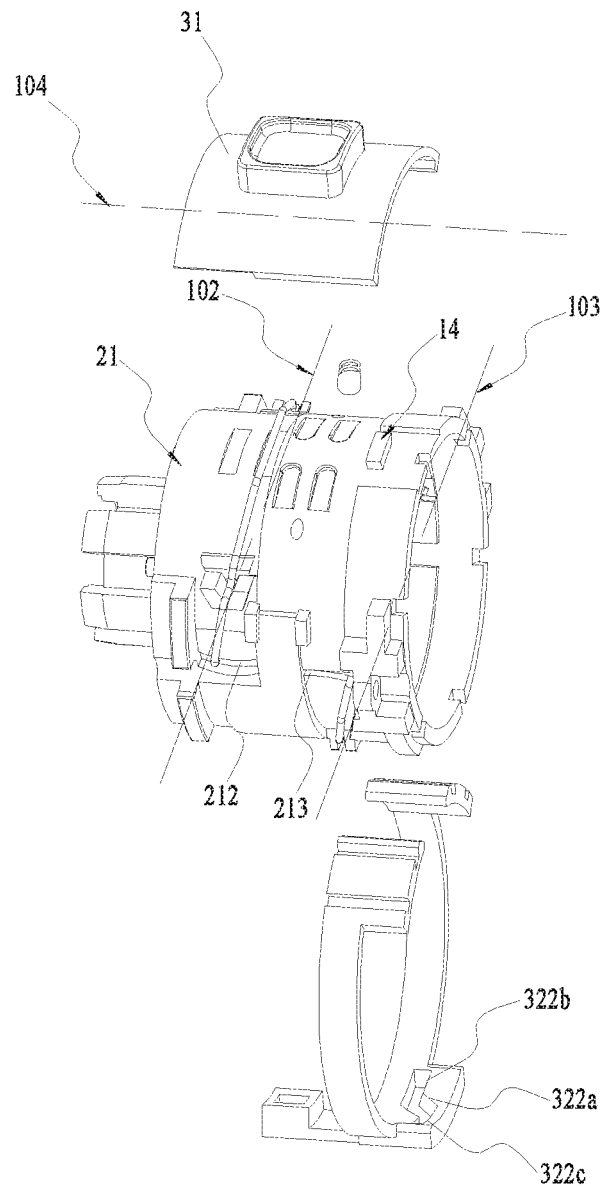
FIG. 12 is an exploded view of a device housing and a shifting device in FIG. 4.
Figure 13:
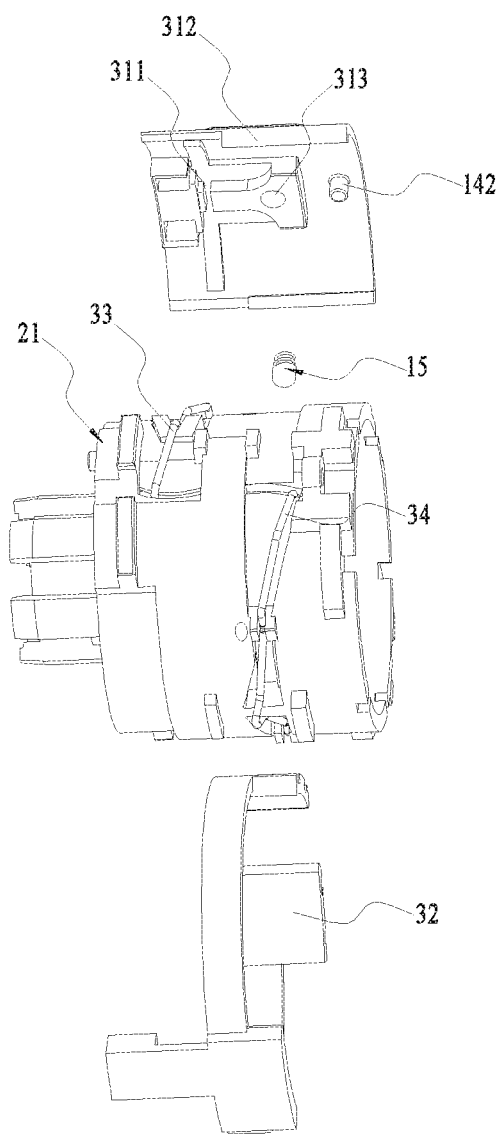
FIG. 13 is a three-dimensional view of a structure shown in FIG. 12 at another viewing angle.
Figure 14:
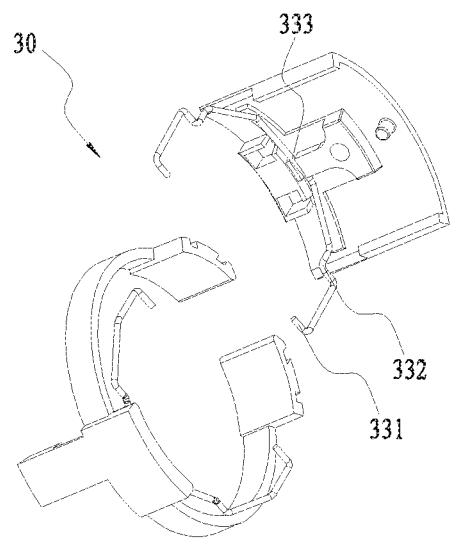
FIG. 14 is an exploded view of a shifting device in FIG. 4.
Figure 15:
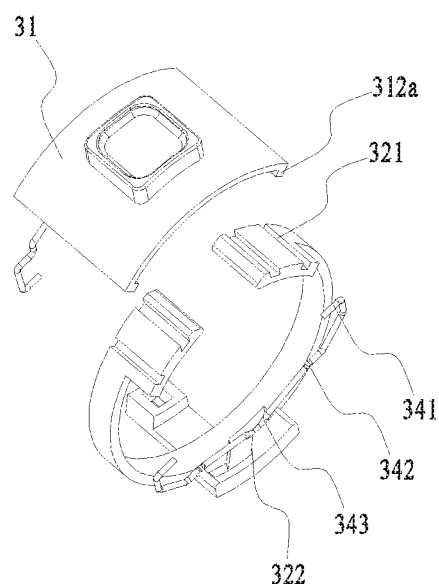
FIG. 15 is a three-dimensional view of a structure shown in FIG. 14 at another viewing angle.
Figure 16:
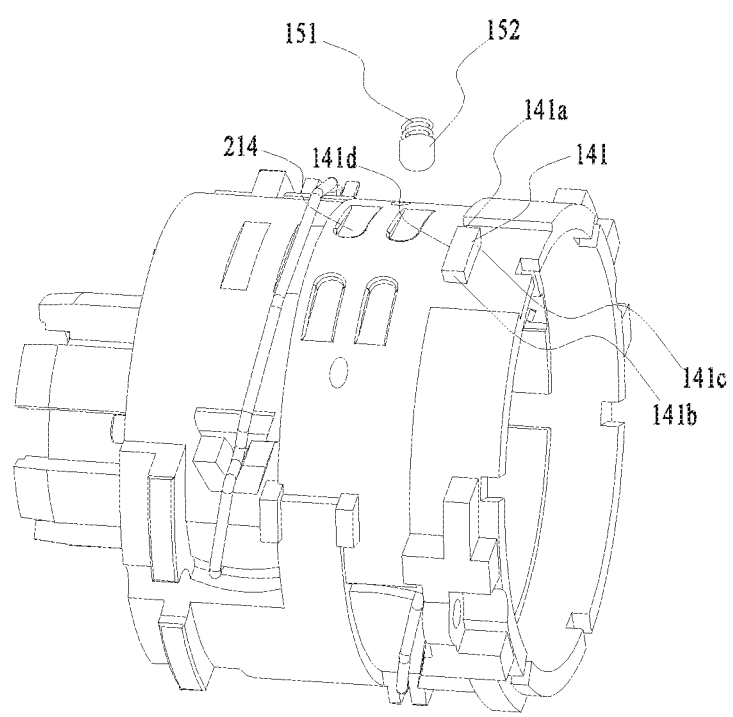
FIG. 16 is an enlarged view of a part of a structure in FIG. 13.

As shown in FIG. 12, FIG. 13, and FIG. 16, the power tool 100 further includes a limiting assembly 14. The limiting assembly 14 is configured to limit rotation of the operation member 31 when the operation member 31 slides relative to the housing 11 and limit sliding of the operation member 31 when the operation member 31 rotates relative to the housing 11. The limiting assembly 14 includes a first limiting structure configured to limit rotation of the operation member 31 when the operation member 31 slides along the first straight line 104 and a second limiting structure configured to limit sliding of the operation member 31 when the operation member 31 rotates by using the central axis 101 as an axis. The first limiting structure specifically includes a first limiting surface 141a and a second limiting surface 141b. The second limiting structure includes a third limiting surface 141c and a fourth limiting surface 141d. Specifically, the limiting assembly 14 includes a first limiting bump 141 formed on the device housing 21 and a second limiting bump 142 cooperating with the first limiting bump 141. The first limiting bump 141 is approximately a rectangle. A group of opposite sides of the rectangle form the first limiting surface 141a and the second limiting surface 141b, and the other group of opposite sides of the rectangle form the third limiting surface 141c and the fourth limiting surface 141d. Both the first limiting surface 141a and the second limiting surface 141b are parallel to the direction of the first straight line 104, and both the third limiting surface 141c and the fourth limiting surface 141d are perpendicular to the direction of the central axis 101. The second limiting bump 142 is formed on the operation member 31, and is approximately a cylinder. An outer wall of the cylinder can come into contact with the first limiting surface 141a, the second limiting surface 141b, the third limiting surface 141c, and the fourth limiting surface 141d. Therefore, when the operation member 31 slides along the first straight line 104, the first limiting surface 141a or the second limiting surface 141b can come into contact with the second limiting bump 142 to limit rotation of the operation member 31. In addition, when the operation member 31 rotates by using the central axis 101 as an axis, the third limiting surface 141c or the fourth limiting surface 141d can come into contact with the second limiting bump 142 to limit sliding of the operation member 31.

The power tool 100 further includes a holding assembly 15 for holding the transmission device 20 in each transmission state. The holding assembly 15 includes a spring 151 and a holding member 152. A hole 313 used for accommodating the spring 151 is provided on the operation member 31, and two ends of the spring 151 respectively abut against the operation member 31 and the holding member 152. The holding member 152 may be specifically a copper cap, four grooves 214 are formed on the device housing 21, and the spring 151 biases the copper cap to cause the copper cap to be partially embedded into the groove 214. In this way, when the operation member 31 moves relative to the housing 11 to different gear positions, the copper cap can move into a corresponding groove 214, so that the transmission device 20 can remain in a corresponding transmission state. In addition, when the copper cap moves to an edge of the groove 214, the spring 151 can biases the copper cap to cause the copper cap to be suddenly embedded into the groove 214, and the copper cap can further make a click sound, improving the hand feel of the user. In addition, the spring 151 is disposed between the operation member 31 and the device housing 21 in a biasing manner, to play a role of vibration attenuation, so as to prevent the operation member 31 from changing in position relative to the device housing 21 due to vibration after the power tool 100 is enabled.

In this example, the transmission device 20 can be in four different transmission states through switching of the shifting device 30.

Figure 17:
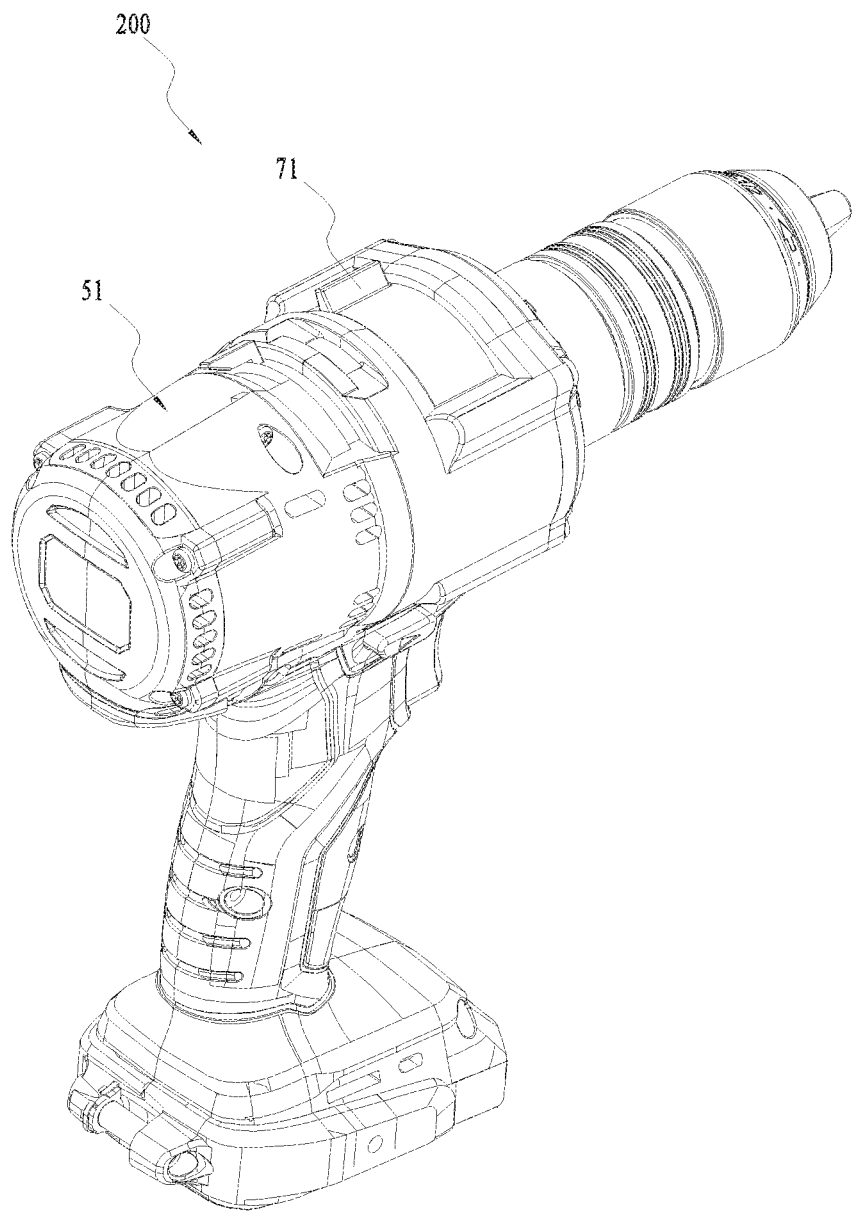
FIG. 17 is also a three-dimensional view of an example power tool according to the description that follows.
Figure 18:
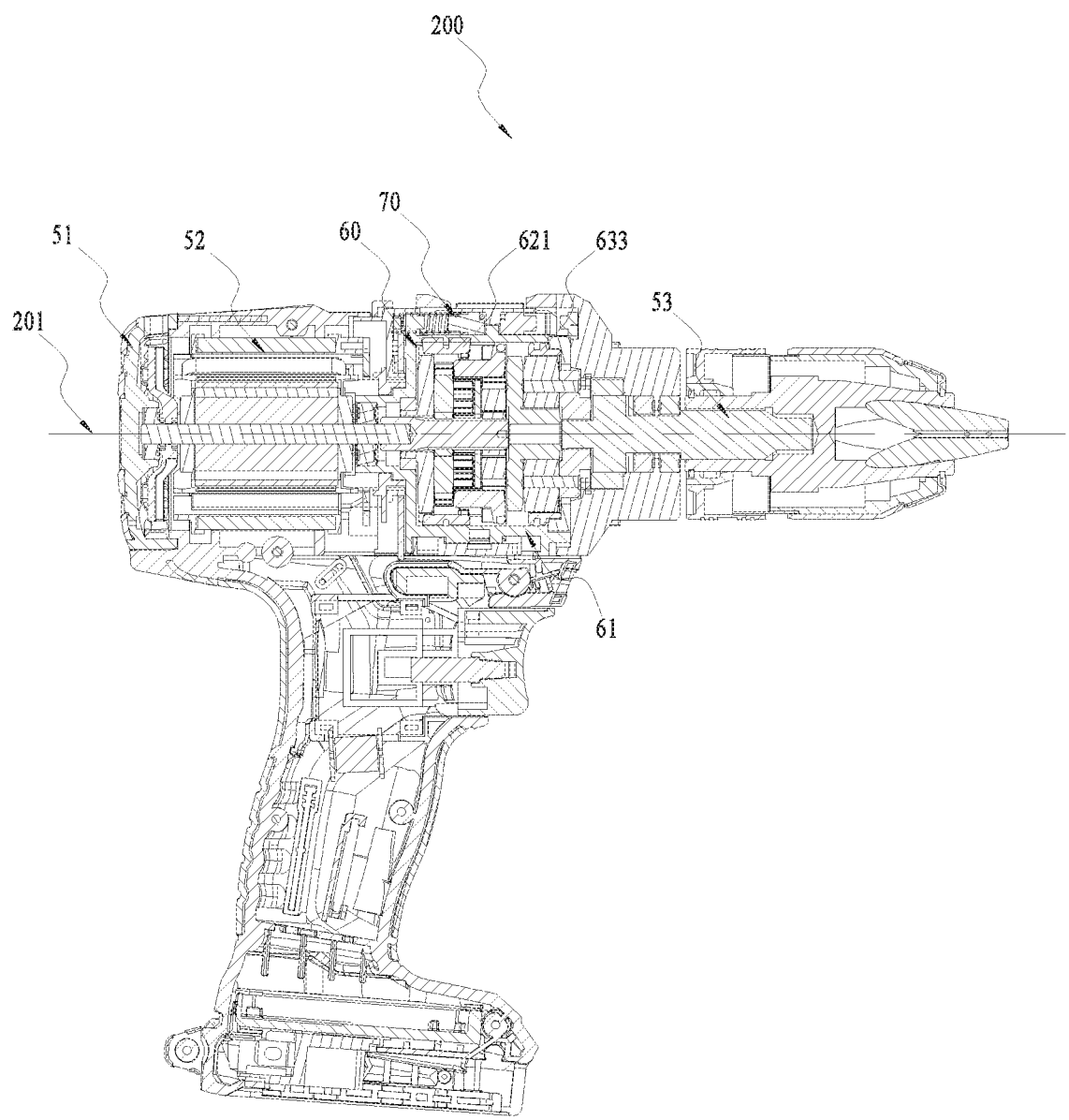
FIG. 18 is a cross-sectional view of the power tool in FIG. 17.
Figure 19:
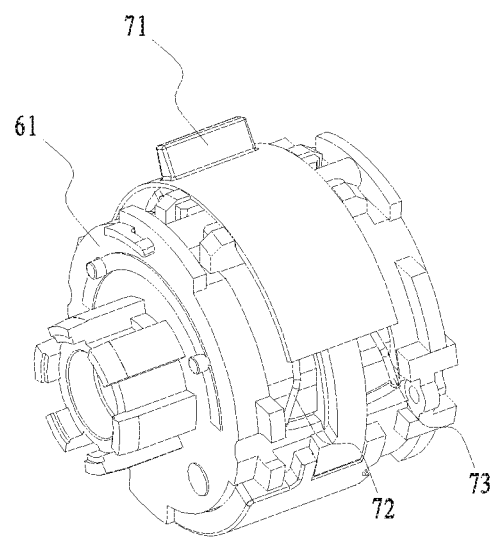
FIG. 19 is a three-dimensional view of a device housing and a shifting device in FIG. 18.
Figure 20:
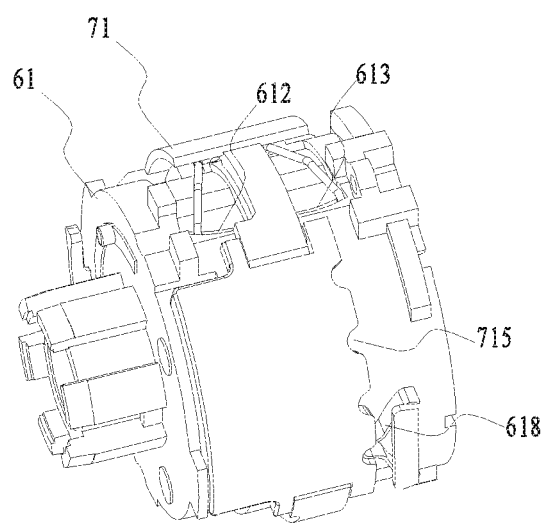
FIG. 20 is a three-dimensional view of a structure shown in FIG. 19 at another viewing angle.
Figure 21:
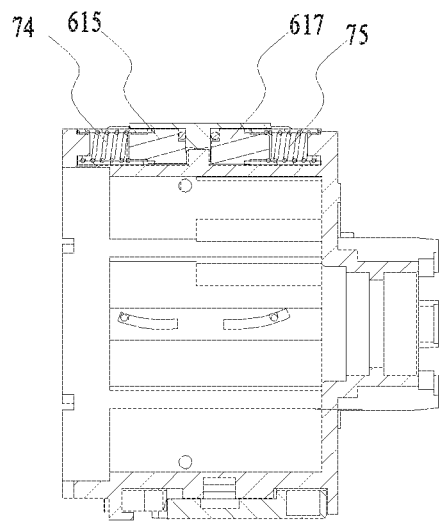
FIG. 21 is a cross-sectional view of a structure shown in FIG. 19.
Figure 22:
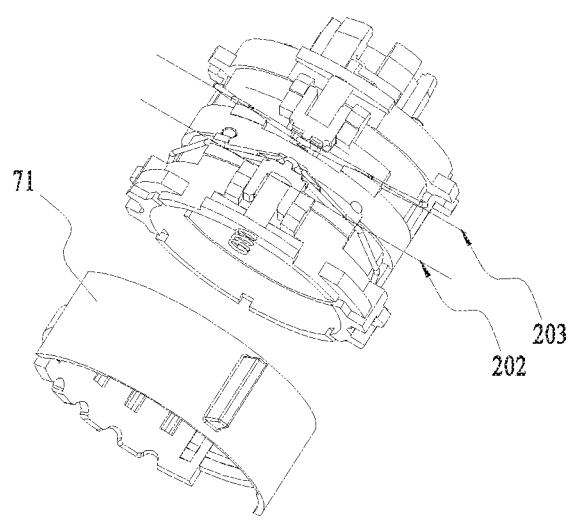
FIG. 22 is an exploded view of a structure shown in FIG. 19.
Figure 23:
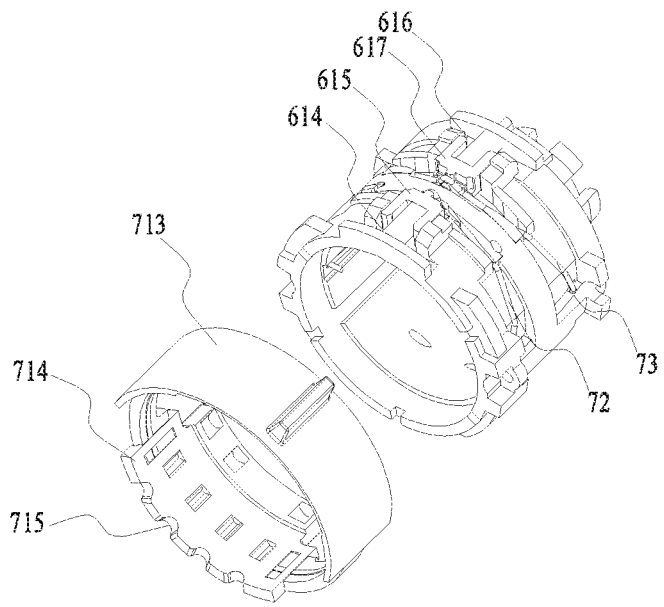
FIG. 23 is a three-dimensional view of a structure shown in FIG. 22 at another viewing angle.
Figure 24:
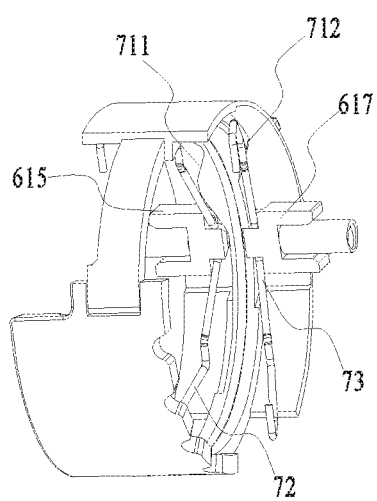
FIG. 24 is a three-dimensional view of a shifting device in FIG. 19.
Figure 25:
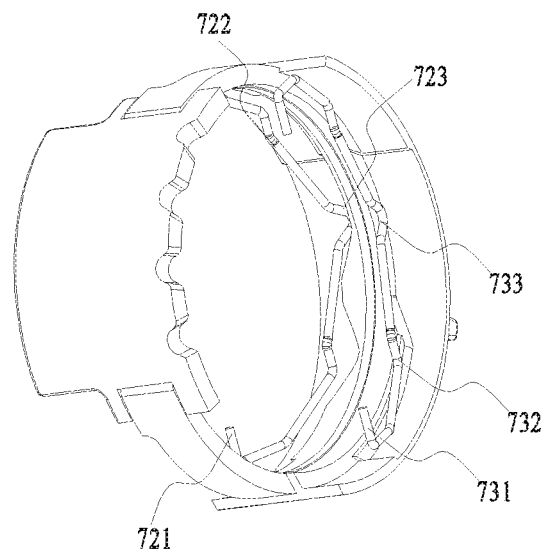
FIG. 25 is a three-dimensional view of an operation member, a first shifting element, and a second shifting element in FIG. 24.

A power tool 200 in a second example shown in FIG. 17 includes a housing 51, a motor 52, and an output member 53 that have same structures as those in the first example, and further includes a transmission device 60 having a same internal structure as that in the first example. A device housing 61 of the transmission device 60 in this example is slightly different from the device housing 61 in the first example. The power tool 200 in this example also includes a shifting device 70 enabling the transmission device 60 to be in four different transmission states. The device housing 61 of the transmission device 60 in this example matches a structure of the gear shifting apparatus 70. It should be noted that each part of the power tool 100 in the first example adapted to this example may be applied to this example, and details are not specifically described again.

As shown in FIG. 17 to FIG. 26, in this example, the device housing 61 is also disposed around a central axis 201. The shifting device 70 specifically includes an operation member 71, a first shifting element 72, and a second shifting element 73. The operation member 71 is operated by a user, and the operation member 71 is formed with or fixedly connected to a first driving structure 711 capable of driving the first shifting element 72 to rotate and a second driving structure 712 capable of driving the second shifting element 73 to rotate.

The first shifting element 72 and the device housing 61 constitute a rotatable connection using a first axis 202 as an axis, and the second shifting element 73 and the device housing 61 constitute a rotatable connection using a second axis 203 as an axis. The first axis 202 is parallel to the second axis 203, and the first axis 202 and the second axis 203 are both perpendicular to the central axis 201. The first shifting element 72 specifically includes a first shifting portion 721, a first rotation shaft portion 722, and a first driven portion 723. The first shifting portion 721 and the first driven portion 723 are respectively disposed on two sides of the first rotation shaft portion 722. The first shifting portion 721 is connected to a first movable member 621 to drive the first movable member 621 to move to a first axial position and a second axial position in a direction of the central axis 201. The first rotation shaft portion 722 is used as a rotation axis point of rotation of the first shifting element 72 using the first axis 202 as an axis. The first driven portion 723 is configured to cooperate with the first driving structure 711. The second shifting element 73 specifically includes a second shifting portion 731, a second rotation shaft portion 732, and a second driven portion 733. The second shifting portion 731 and the second driven portion 733 are respectively disposed on two sides of the second rotation shaft portion 732. The second shifting portion 731 is connected to a second movable member 633 to drive the second movable member 633 to move to a third axial position and a fourth axial position in the direction of the central axis 201. The second rotation shaft portion 732 is used as a rotation axis point of rotation of the second shifting element 73 using the second axis 203 as an axis. The second driven portion 733 is configured to cooperate with the second driving structure 712.

The device housing 61 is further formed with a first arc-shaped hole 612 and a second arc-shaped hole 613. The first arc-shaped hole 612 extends in a circumferential direction around the first axis 202, and the second arc-shaped hole 613 extends in a circumferential direction around the second axis 203. The first shifting element 72 runs through the first arc-shaped hole 612, and the second shifting element 73 runs through the second arc-shaped hole 613, so that the first arc-shaped hole 612 can guide the first shifting element 72 to rotate by using the first axis 202 as an axis, and the second arc-shaped hole 613 can guide the second shifting element 73 to rotate by using the second axis 203 as an axis.

Specifically, the first driving structure 711 specifically includes a first driving inclined surface 711a and a first vertical surface 711b. A plane in which the first driving inclined surface 711a lies obliquely intersects with the first axis 202, and further obliquely intersects with the central axis 201. In this way, when the operation member 71 rotates, the first driving inclined surface 711a can drive the first shifting element 72 to rotate to a first position and a second position. Similarly, the second driving structure 712 includes a second driving inclined surface 712a and a second vertical surface 712b. A plane in which the second driving inclined surface 712a lies obliquely intersects with the second axis 203, and further obliquely intersects with the central axis 201. In this way, when the operation member 71 rotates, the second driving inclined surface 712a can drive the second shifting element 73 to rotate to a third position and a fourth position.

To enable the first shifting element 72 to always remain in contact with the first driving structure 711, the shifting device 70 includes a first biasing element 74. The first biasing element 74 generates a biasing force for biasing the first shifting element 72 to come into contact with the first driving structure 711. Specifically, a first chute 614 is formed on the device housing 61, and a first sliding block 615 in contact with the first driven portion 723 of the first shifting element 72 is disposed in the first chute 614. The first sliding block 615 is slidably disposed in the first chute 614. The first biasing element 74 biases the first sliding block 615, so that the first sliding block 615 supports the first driven portion 723 and the first driven portion 723 always remains in contact with the first driving inclined surface 711a or the first vertical surface 711b.

Similarly, the shifting device 70 includes a second biasing element 75. The second biasing element 75 generates a biasing force for biasing the second shifting element 73 to come into contact with the second driving structure 712. Specifically, a second chute 616 is formed on the device housing 61, and a second sliding block 617 in contact with the second driven portion 733 of the second shifting element 73 is disposed in the second chute 616. The second sliding block 617 is slidably disposed in the second chute 616. The second biasing element 75 biases the second sliding block 617, so that the second sliding block 617 supports the second driven portion 733 and the second driven portion 733 always remains in contact with the second driving inclined surface 712a or the second vertical surface 712b.

Figure 26:
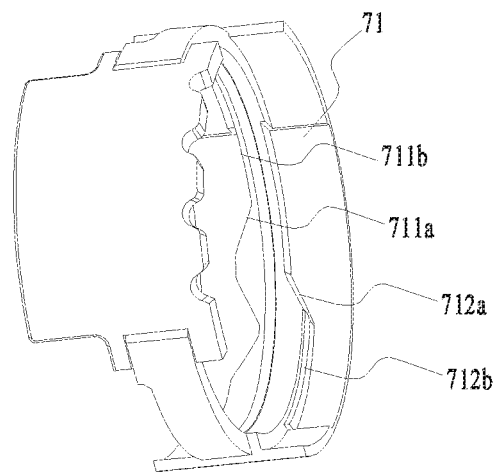
FIG. 26 is a three-dimensional view of an operation member in FIG. 25.

Specifically, the first driving structure 711 includes three first driving inclined surfaces 711a and four first vertical surfaces 711b. As shown in FIG. 26, the three first driving inclined surfaces 711a and the four first vertical surfaces 711b are sequentially disposed at intervals. The second driving structure 712 includes one second driving inclined surface 712a and two second vertical surfaces 712b. As shown in FIG. 26, two ends of the second driving inclined surface 712a are respectively connected to the two second vertical surfaces 712b. In this way, when the operation member 71 rotates relative to the housing 51, the transmission device 60 can be in four different transmission states by setting a correspondence between the first driving structure 711 and the second driving structure 712.

In this example, the operation member 71 includes an operation portion 713 and a driving portion 714. The operation portion 713 and the driving portion 714 are two components, and the two components are fixedly connected to each other, thereby improving the operation stability. Actually, the technical solution described herein can be implemented provided that the operation portion 713 and the driving portion 714 synchronously rotate. In addition, in another example, the operation portion 713 and the driving portion 714 may alternatively be integrated.

The operation member 71 is further formed with four recesses 715, and a spring plate 618 that can be embedded into different recesses 715 when the transmission device 60 is in different transmission states is connected to the device housing 61. The shifting device 70 can make a click sound under action of the recesses 715 and the spring plate 618, to improve the hand feeling of the user. In addition, the spring plate 618 can further play a role of vibration attenuation, so as to prevent the operation member 71 from changing in position relative to the device housing 61 due to vibration after the power tool 200 is enabled.

The basic principle, main features, and advantages of the subject disclosure are displayed and described above. A person skilled in the art should understand that the foregoing examples do not limit the invention hereinafter claimed in any form, and a technical solution obtained through equivalent replacement or equivalent change falls within the protection scope of the claimed invention.

What is claimed is:

1. A power tool, comprising:
   an output member configured to output power;
   a motor configured to drive the output member;
   a housing configured to accommodate the motor;
   a transmission device configured to transmit power between the motor and the output member and having at least four transmission states in which the output member is capable of outputting different power; and
   a shifting device configured to drive the transmission device to switch between different ones of the at least four transmission states;
   wherein the shifting device comprises:
   a first shifting element capable of switching between at least a first position and a second position in which the transmission device is in respective first and second ones of the at least four transmission states;
   a second shifting element capable of switching between at least a third position and a fourth position in which the transmission device is in respective third and fourth ones of the at least four transmission states;
   an operation member operated by a user, wherein the operation member can slide relative to the housing in a first straight line and rotate relative to the housing about a central axis; and
   a connecting member for connecting the operation member to the second shifting element;
   wherein, when the operation member slides relative to the housing, the operation member drives the first shifting element to switch between the first position and the second position whereupon a position of the second shifting element remains unchanged and, when the operation member rotates relative to the housing, the connecting member drives the second shifting element to switch between the third position and the fourth position whereupon a position of the first shifting element remains unchanged.

2. The power tool according to claim 1, further comprising a limiting device configured to limit rotation of the operation member when the operation member slides relative to the housing and limit sliding of the operation member when the operation member rotates relative to the housing.

3. The power tool according to claim 1, wherein the first shifting element is capable of rotating to the first position and the second position by using a first axis as an axis and the second shifting element is capable of rotating to the third position and the fourth position by using a second axis as an axis.

4. The power tool according to claim 3, wherein the first axis of rotation of the first shifting element is parallel to or overlaps the second axis of rotation of the second shifting element.

5. The power tool according to claim 1, wherein the operation member comprises a first driving portion connected to the first shifting element to drive the first shifting element to switch between the first position and the second position when the operation member slides and to allow the position of the first shifting element to remain unchanged when the operation member rotates and a second driving portion connected to the connecting member to drive the connecting member to rotate when the operation member rotates and to allow a position of the connecting member to remain unchanged when the operation member slides.

6. The power tool according to claim 5, wherein the first straight line in which the operation member slides is parallel to the central axis of rotation of the operation member, the first driving portion is an arc-shaped groove extending in a circumferential direction around the central axis, and the first shifting element comprises a first driven portion at least partially extending into the arc-shaped groove.

7. The power tool according to claim 6, wherein the second driving portion is a bump extending in a direction parallel to the first straight line or a recess extending in the direction of the first straight line and the connecting member is formed with a recess into which the bump can be embedded or a bump that can be embedded into the recess.

8. The power tool according to claim 6, wherein the connecting member is formed with a third driving portion configured to drive the position of the second shifting element to change when the connecting member rotates.

9. The power tool according to claim 8, wherein the third driving portion comprises an inclined surface extending along a plane obliquely intersecting with the central axis and the second shifting element comprises a second driven portion in contact with the inclined surface.

10. The power tool according to claim 1, further comprising a chuck configured to connect to a drill wherein the chuck is connected to the output member.

11. A power tool, comprising:
an output shaft configured to output power;
a motor comprising or connected to a drive shaft;
a housing configured to accommodate the motor;
a transmission device configured to transmit power between the output shaft and the drive shaft and having at least two different transmission states in which the output shaft outputs power at different rotation speed; and
a shifting device configured to drive the transmission device to switch between a first one of the at least two transmission states and a second one of the at least two transmission states;
wherein the transmission device comprises a first movable member disposed around a central axis and a device housing formed with an accommodation cavity used for accommodating the first movable member;
wherein the first movable member and the device housing constitute a slidable connection in a direction parallel to the central axis, the shifting device comprises a first shifting element capable of sliding relative to the device housing and driving the first movable member to slide when moving relative to the device housing, an operation member operated by a user and capable of moving relative to the housing, and the operation member is further formed with or connected to a first driving structure comprising a first driving inclined surface in contact with the first shifting element and driving the first shifting element to move when the operation member moves relative to the housing.

12. The power tool according to claim 11, wherein the operation member and the housing constitute a rotatable connection using the central axis as an axis and a plane in which the first driving inclined surface lies obliquely intersects with the central axis.

13. The power tool according to claim 11, wherein the first shifting element and the device housing constitute a rotatable connection using a first axis as an axis and a plane in which the first driving inclined surface lies obliquely intersects with the first axis.

14. The power tool according to claim 13, wherein the operation member and the housing constitute a rotatable connection using the central axis as an axis, and the first axis of rotation of the first shifting element relative to the device housing is perpendicular to the central axis.

15. The power tool according to claim 14, wherein the transmission device is further formed with a first arc-shaped hole extending in a circumferential direction around the first axis and the first shifting element runs through the first arc-shaped hole.

16. The power tool according to claim 14, wherein the first shifting element comprises a first shifting portion connected to the first movable member, a first rotation shaft portion being a rotation axis point of the rotatable connection constituted by the first shifting element and the device housing, and a first driven portion configured to come into contact with the first driving structure, to be driven by the first driving structure, wherein the first shifting portion and the first driven portion are respectively disposed on two sides of the first rotation shaft portion.

17. The power tool according to claim 11, wherein the shifting device further comprises a first biasing element for generating a biasing force causing the first shifting element and the first driving structure to remain in contact with each other.

18. The power tool according to claim 11, wherein the first driving structure further comprises a first vertical surface connected to the first driving inclined surface and the first vertical surface obliquely intersects with the first driving inclined surface.

19. The power tool according to claim 11, wherein the transmission device further comprises a second movable member disposed around the central axis, the second movable member, the device housing constitute a slidable connection in a direction parallel to the central axis, and the shifting device comprises a second shifting element for constituting a movable connection with the device housing and driving the second movable member to slide when moving relative to the device housing, and the operation member is further formed with or connected to a second driving structure, comprising a second driving inclined surface in contact with the second shifting element, for driving the second shifting element to move when the operation member moves relative to the housing.

20. The power tool according to claim 11, further comprising a chuck configured to connect to a drill wherein the chuck is connected to the output shaft.

* * * * *